US006163686A

United States Patent [19]

Sato et al.

[11] Patent Number: 6,163,686

[45] Date of Patent: Dec. 19, 2000

[54] SIGNAL SELECTING CIRCUIT

[75] Inventors: Shigeru Sato, Miyagi-ken; Hirokazu Watanabe, Fukushima-ken, both of Japan

[73] Assignee: Alps Electric Co., Ltd., Japan

[21] Appl. No.: 09/174,968

[22] Filed: Oct. 19, 1998

[30] Foreign Application Priority Data

Nov. 4, 1997 [JP] Japan .................................... 9-301847

[51] Int. Cl.[7] ....................................................... H04B 1/10

[52] U.S. Cl. ............................. 455/282; 455/78; 455/327

[58] Field of Search ................................ 455/282, 277.1, 455/289, 78, 327

[56] References Cited

U.S. PATENT DOCUMENTS

| | | | |
|---|---|---|---|
| 3,939,429 | 2/1976 | Lohn et al. | 325/432 |
| 5,369,795 | 11/1994 | Yanagimoto | 455/327 |
| 5,530,927 | 6/1996 | Smith | 455/317 |
| 6,070,059 | 5/2000 | Kato et al. | 455/78 |

FOREIGN PATENT DOCUMENTS

| | | |
|---|---|---|
| 5283901A | 10/1993 | Japan . |
| 6132701A | 5/1994 | Japan . |
| 7030825A | 1/1995 | Japan . |
| 7099611A | 4/1995 | Japan . |

*Primary Examiner*—Daniel S. Hunter
*Assistant Examiner*—Thuan T. Nguyen
*Attorney, Agent, or Firm*—Brinks Hofer Gilson & Lione

[57] ABSTRACT

A signal selecting circuit comprises a first switch means connected between a first input terminal and a common output terminal, a second switch means connected between a second input terminal and the common output terminal, a first microstrip line for connecting the first switch means and the common output terminal, and a second microstrip line for connecting the second switch means and the common output terminal, wherein a length of the first microstrip line is set to be approximately odd-numbered times of ¼ wavelength of a frequency of an image signal relative to the second mode reception signal, and a length of the second microstrip line is set to be approximately odd-numbered times of ¼ wavelength of a frequency of an image signal relative to the first mode reception signal.

5 Claims, 2 Drawing Sheets

SIGNAL SELECTING CIRCUIT

BACKGROUND OF THE INVENTION

1. Field of the Invention

The present invention relates to a signal selecting circuit for use with a satellite broadcasting reception converter installed in the outdoors or the like.

2. Description of the Related Art

A conventional signal selecting circuit will be described with reference to FIG. 3. A first reception signal (e.g. vertically-polarized satellite broadcasting signal) and a second reception signal (e.g. horizontally-polarized satellite broadcasting signal) are inputted to a first input terminal 31 and a second input terminal 32. The first reception signal is amplified by a first high-frequency amplifier 33, and the second reception signal is amplified by a second high-frequency amplifier 34. The first high-frequency amplifier 33 and a common output terminal 36; and the second high-frequency amplifier 34 and the common output terminal 36 are connected by a first microstrip line 35 and a second microstrip line 37, respectively. The first reception signal amplified by the first high-frequency amplifier 33 is outputted through the first microstrip line 35 to the common output terminal 36, and the second reception signal amplified by the second high-frequency amplifier 34 is outputted through the second microstrip line 37 to the common output terminal 36.

The first microstrip line 35 and the second microstrip line 37 have a predetermined characteristic impedance, and the lengths thereof are set to ½ wavelength of frequencies of the first reception signal and the second reception signal which are respectively transmitted through the first microstrip line 35 and the second microstrip line 37.

A DC voltage B is supplied through a switch 38 to the first high-frequency amplifier 33 or the second high-frequency amplifier 34. That is, when the first reception signal is received, the switch 38 allows the DC voltage B to be supplied to the first high-frequency amplifier 33 to set the first high-frequency amplifier 33 in the operable state, whereby the first reception signal inputted to the first input terminal 31 is amplified by the first high-frequency amplifier 33 and then supplied through the first microstrip line 35 to the common output terminal 36. At that time, the second high-frequency amplifier 34 is de-energized by a low DC voltage applied thereto through a resistor 40. As a consequence, the second reception signal inputted to the second input terminal 32 is not amplified but attenuated by the second high-frequency amplifier 34. Moreover, since the length of the second microstrip line 37 is set to the ½ wavelength, the impedance of the second microstrip line 37 increases as seen from the common output terminal 36, and hence the second reception signal is not delivered to the common output terminal 36. Accordingly, only the first reception signal is inputted to the subsequent amplifier 41.

Then, since the low DC voltage is applied to the second high-frequency amplifier 34, its output impedance is fixed so that the input impedance of the subsequent amplifier 41 becomes difficult to be affected.

On the other hand, when the second reception signal is received, the switch 38 allows the DC voltage B to be supplied to the second high-frequency amplifier 34 to set the second high-frequency amplifier 33 to the operable state, whereby the second reception signal inputted to the second input terminal 32 is amplified by the second high-frequency amplifier 33 and then supplied through the second microstrip line 37 to the common output terminal 36. At that time, the first high-frequency amplifier 33 is de-energized by the low DC voltage applied thereto through a resistor 39. As a consequence, the first reception signal inputted to the first input terminal 31 is not amplified but attenuated by the first high-frequency amplifier 33. Also, since the length of the first microstrip line 35 is set to the ½ wavelength, the impedance of the first microstrip line 35 increases as seen from the common output terminal 36, and hence the first reception signal is not delivered to the common output terminal 36. Accordingly, only the second reception signal is inputted to the subsequent amplifier 41.

Then, also in this case, since the low DC voltage is applied to the first high-frequency amplifier 33, its output impedance is fixed so that the input impedance of the subsequent amplifier 41 becomes difficult to be affected.

In the above-mentioned conventional signal selecting circuit, although neither a reception signal nor a disturbance signal is outputted to the common output terminal 36 from the line through which an undesired reception signal is transmitted, a disturbance signal such as an image signal relative to a desired reception signal is outputted to the common output terminal 36 from the line through which the desired reception signal is transmitted. There is then the risk that a disturbance will occur.

SUMMARY OF THE INVENTION

It is an object of the present invention to provide a signal selecting circuit in which an undesired reception signal is interrupted and a disturbance signal of an image signal may be avoided by attenuating the image signal relative to a desired reception signal.

In view of the aforesaid aspect, according to the present invention, there is provided a signal selecting circuit which comprises a first input terminal to which a first reception signal is inputted, a second input terminal to which a second reception signal is inputted, a common output terminal to which one of the first reception signal and the second reception signal inputted to the second input terminal is selectively outputted, a first switch means connected between the first input terminal and the common output terminal, and a second switch means connected between the second input terminal and the common output terminal, a first microstrip line for connecting the first switch means with the common output terminal and a second microstrip line for connecting the second switch means with the common output terminal, wherein a length of the first microstrip line is set to be approximately odd-numbered times of ¼ wavelength of a frequency of an image signal relative to the second reception signal, a length of the second microstrip line is set to be approximately odd-numbered times of ¼ wavelength of a frequency of an image signal relative to the first reception signal, and the first switch means or the second switch means allows either the first reception signal or the second reception signal to be outputted to the common output terminal.

Further, in the signal selecting circuit according to the present invention, the first switch means is comprised of a first amplifying element, the second switch means is comprised of a second amplifying element, an input terminal of the first amplifying element is connected to the first input terminal, an output terminal of the first amplifying element is connected to the first microstrip line, an input terminal of the second amplifying element is connected to the second input terminal, and an output terminal of the second amplifying element is connected to the second microstrip line.

Further, in the signal selecting circuit according to the present invention, the first amplifying element and the second amplifying element are respectively comprised of a first high electron mobility type field-effect transistor and a second high electron mobility type field-effect transistor, the gate of the first high electron mobility type field-effect transistor is connected to the first input terminal, the drain thereof is connected to the first microstrip line, the gate of the second high electron mobility type field-effect transistor is connected to the second input terminal, and the drain thereof is connected to the second microstrip line.

Further, in the signal selecting circuit according to the present invention, a frequency band of each reception signal is divided into a high-frequency band and a low-frequency band, the length of the first microstrip line is set to be approximately odd-numbered times of ¼ wavelength of the image signal relative to the second reception signal, and the length of the second microstrip line is set to be approximately odd-numbered time of ¼ wavelength of the image signal relative to the first reception signal.

Furthermore, in the signal selecting circuit according to the present invention, the length of the first microstrip line is set to be approximately odd-numbered times of ¼ wavelength of the image signal relative to the second reception signal having a frequency higher than an intermediate frequency of the high-frequency band, and the length of the second microstrip line is set to be approximately odd-numbered times of ¼ wavelength of the image signal relative to the first reception signal having a frequency higher than an intermediate frequency of the high-frequency band.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1:
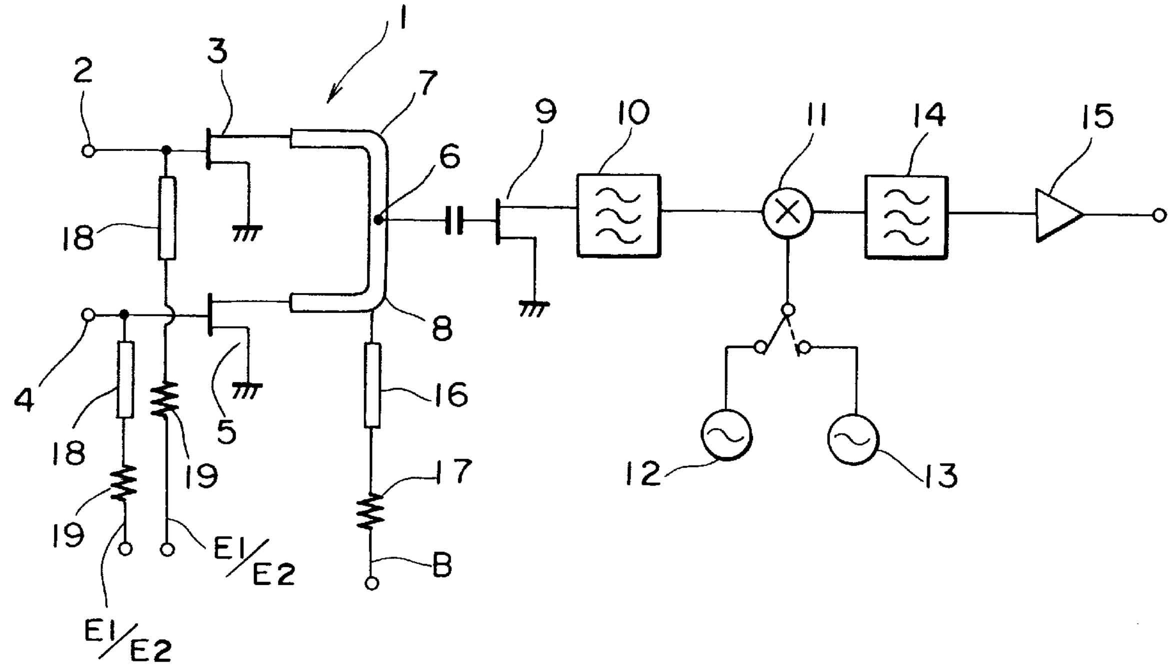
FIG. 1 is a block diagram showing a satellite broadcasting reception converter using a signal selecting circuit according to the present invention.
Figure 3:
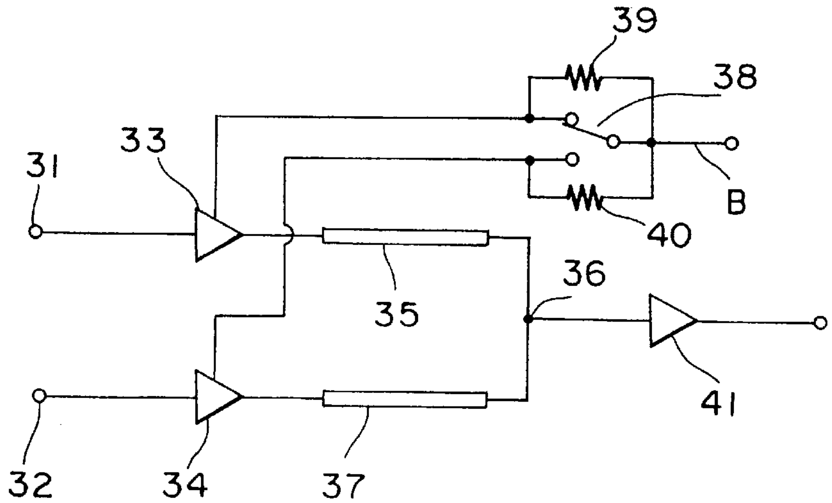
FIG. 3 PRIOR ART
FIG. 3 is a circuit diagram showing a conventional signal selecting circuit.
Figure 2:
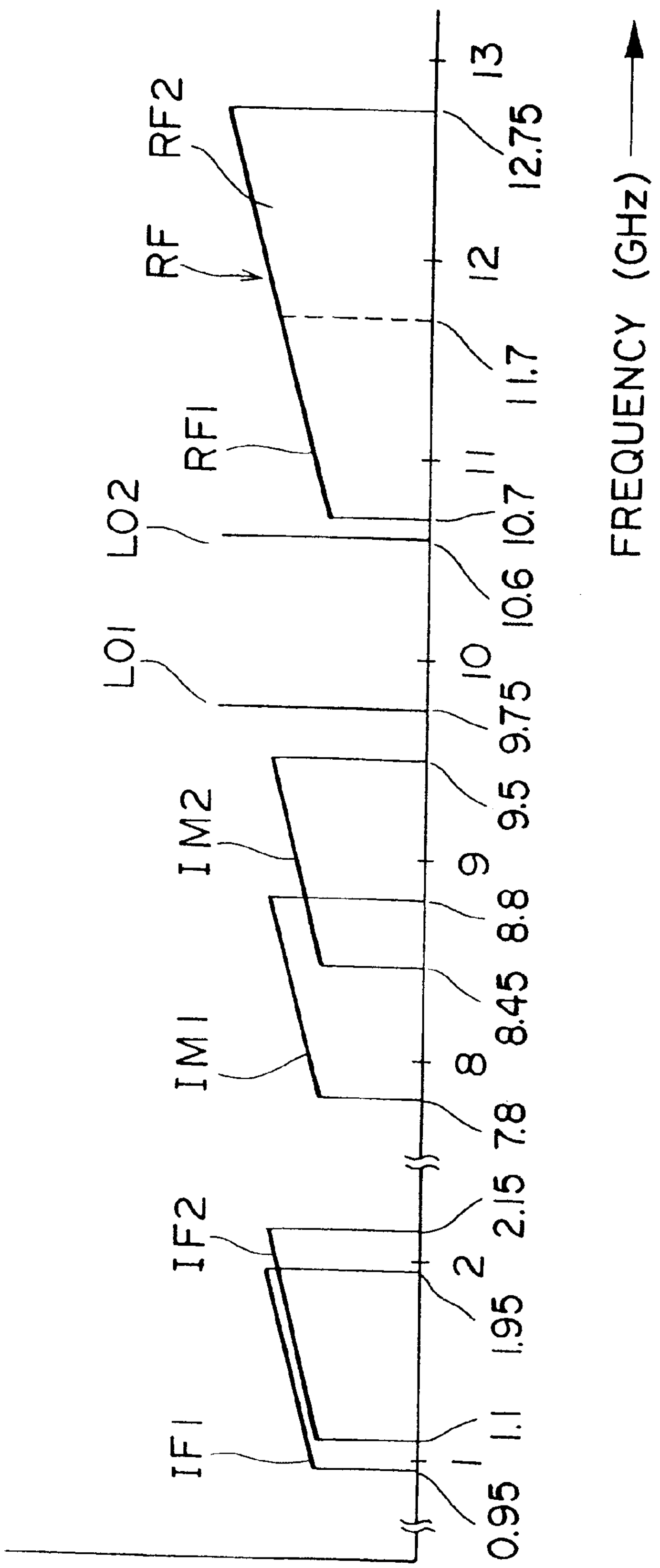
FIG. 2 is a frequency diagram in a satellite broadcasting reception converter using a signal selecting circuit according to the present invention.

A signal selecting circuit according to the present invention will hereinafter be described with reference to FIGS. 1 and 2. FIG. 1 is a block diagram showing a satellite broadcasting reception converter using a signal selecting circuit according to the present invention. FIG. 2 is a frequency diagram showing a relationship of frequencies of respective signals in the satellite broadcasting reception converter.

Initially, as shown in FIG. 1, a signal selecting circuit 1 comprises a first FET (field-effect transistor) 3 serving as a first switch means connected to a first input terminal 2, a second FET 5 serving as a second switch means connected to a second input terminal 4, a first microstrip line 7 connected between the first FET 3 and a common output terminal 6, and a second microstrip line 8 connected between the second FET 5 and the common output terminal 6.

A first reception signal (e.g. vertically-polarized satellite broadcasting signal) and a second reception signal (e.g. horizontally-polarized satellite broadcasting signal) received at a parabolic antenna (not shown) are respectively inputted through a waveguide (not shown) to a first input terminal 2 and a second input terminal 4 of the signal selecting circuit 1. Then, any one of the first and second reception signals is selected and outputted to the common output terminal 6.

The first reception signal or the second reception signal developed at the common output terminal 6 is amplified by a low-noise amplifier 9, and inputted through a bandpass filter 10 to a mixer 11. Then, the first reception signal or the second reception signal inputted to the mixer 11 is mixed with any one of local oscillation signals having different frequencies inputted to the mixer 11 from a first local oscillator 12 and a second local oscillator 13, and thereby frequency-converted into an intermediate-frequency signal. This intermediate-frequency signal is outputted through an intermediate-frequency bandpass filter 14 to an intermediate-frequency amplifier 15. This intermediate-frequency signal is inputted to a tuner unit of a satellite broadcasting receiver, not shown, and a desired channel is selected by this tuner unit.

A relationship among the frequencies of the first and second reception signal, the intermediate-frequency signal and the local oscillation signals will be described with reference to FIG. 2.

A satellite broadcasting wave is vertically polarized or horizontally polarized and disposed within a broadcasting band RF of 10.7 GHz to 12.75 GHz. The vertically-polarized broadcasting wave and the horizontally-polarized broadcasting wave are separately received at antennas such as parabolic antennas, not shown. The vertically-polarized broadcasting wave is inputted to the first input terminal 2 as the first reception signal, and the horizontally-polarized broadcasting wave is inputted to the second input terminal 4 as the second reception signal.

Then, when the broadcasting wave lying within the first band RF1 of 10.7 GHz to 11.7 GHz is received, a first local oscillation signal LO1 having a frequency of 9.75 GHz is supplied from the first local oscillator 12 to the mixer 11, and thereby the reception signal is frequency-converted into an intermediate-frequency signal of a first intermediate-frequency band IF1 having a frequency ranging from 0.95 GHz to 1.95 GHz. Also, when a broadcasting wave lying within a second band RF2 of 11.7 GHz to 12.75 GHz is received, a second local oscillation signal L02 having a frequency of 10.6 GHz is supplied from the second local oscillator 12 to the mixer 11, and thereby the reception signal is frequency-converted into an intermediate-frequency signal of a second intermediate-frequency band IF2 having a frequency ranging from 1.1 GHz to 2.15 GHz.

With the above-mentioned frequency relationships, with respect to each reception signal lying within the first band RF1, a signal lying within a first image band IM1 having a frequency ranging from 7.8 GHz to 8.8 GHz becomes an image signal. With respect to each reception signal lying within the second band RF2, a signal lying within a second image band IM2 having a frequency ranging from 8.45 GHz to 9.5 GHz becomes an image signal.

Also, the bandpass filter 10 is set so as to pass signals having frequencies ranging from 10.7 GHz to 12.7 GHz, and the intermediate-frequency filter 14 is set so as to pass signals having frequencies ranging from 0.95 GHz to 2.15 GHz in accordance with the broadcasting band RF.

Referring back to FIG. 1, the gate which is the input terminal of the first FET 3 and the gate which is the input terminal of the second FET 5 are connected to the first input terminal 2 and the second input terminal 4, respectively. The drain which is the output terminal of the first FET 3 and the drain which is the output terminal of the second FET 5 are connected to the first microstrip line 7 and the second microstrip line 8, respectively.

A DC voltage B is applied through a choke inductor 16 and a resistor 17 to the first microstrip line 7 and the second microstrip line 8, and this DC voltage is supplied to the drain of the first FET 3 and the drain of the second FET 5. The source of the first FET 3 and the source of the second FET 5 are connected to the grounds.

Signal selection control voltages E1, E2 are respectively supplied through choke inductors 18, 18 and resistors 19, 19 to the gate of the first FET 3 and the gate of the second FET 5. For example, when the first reception signal inputted to the first input terminal 2 is selected, a proper bias current is made to flow to the drain-source path of the first FET 3, whereby the positive control voltage E1 is applied to the first FET 3 so that the first FET 3 is rendered an amplifying function and the negative control voltage E2 is applied to the gate of the second FET 5 so that the second FET 5 is placed in the cut-off state.

Then, the first FET 3 amplifies the first reception signal inputted to the first input terminal 2 and outputs the amplified first reception signal through the first microstrip line 7 to the common output terminal 6. Then, since the second FET 5 is in the cut-off state, its drain becomes opened so that the second reception signal inputted to the second input terminal 4 is not outputted to the common output terminal 6.

On the other hand, when the second reception signal inputted to the second input terminal 4 is selected, a proper bias current is made to flow to the drain-source path of the second FET 5, whereby the positive control voltage E1 is applied to the gate of the second FET 5 so that the second FET 5 is rendered an amplifying function and the negative control voltage E2 is applied to the gate of the first FET 3 so that the first FET 3 is placed in the cut-off state.

Then, the second FET 5 amplifies the second reception signal inputted to the second input terminal 4, and outputs the thus amplified second reception signal through the second microstrip line 8 to the common output terminal 6. Then, since the first FET 3 is placed in the cut-off state, its drain becomes opened so that the first reception signal inputted to the first input terminal 2 is not outputted to the common output terminal 6.

The length of the first microstrip line 7 is set to be odd-numbered times of ¼ wavelength of a frequency of an image signal (referred to as an image frequency) relative to the second reception signal inputted to the second input terminal 4. Also, the length of the second microstrip line 8 is set to be odd-numbered times of ¼ wavelength of the image frequency relative to the first reception signal inputted to the first input terminal 2. If the frequency of the first reception signal and the frequency of the second reception signal are the same, the lengths of the first microstrip line 7 and the second microstrip line 8 are set to the same. In the above-mentioned example, since the image frequency lies within the whole band (7.8 GHz to 9.5 GHz) of the first image band IM1 and the second image band IM2, the length of the first microstrip line 7 and the length of the second microstrip line 8 are set to be odd-numbered times of ¼ wavelength of approximately 8.7 GHz which is an intermediate image frequency. According to this arrangement, when the first reception signal, for example, is received, the second FET 5 is in the cut-off state and its drain becomes opened. In addition, since the length of the second microstrip line 8 is set to be odd-numbered times of ¼ wavelength of an intermediate image frequency (8.7 GHz) relative to the first reception signal, this second microstrip line 8 becomes an open stub of ¼ wavelength in the intermediate image frequency (8.7 GHz). Accordingly, the signal of the intermediate image frequency (8.7 GHz) relative to the first reception signal and the signals of frequencies higher and lower the intermediate image frequency are attenuated and an image disturbance may be improved relative to the whole (7.8 GHz to 9.5 GHz) of the first image band and the second image band.

On the other hand, when the second reception signal is received, the first FET 3 is placed in the cut-off state and its drain becomes opened. In addition, since the length of the first microstrip line 7 is set to be odd-numbered times of ¼ wavelength of an intermediate image frequency (8.7 GHz) relative to the second reception signal, this first microstrip line 7 becomes an open stub of ¼ wavelength in the intermediate image frequency (8.7 GHz). Accordingly, the signal of the intermediate image frequency (8.7 GHz) relative to the second reception signal and the signals of frequencies higher and lower the intermediate image frequency are attenuated and an image disturbance may be improved relative to the whole (7.8 GHz to 9.5 GHz) of the first image band and the second image band.

As described above, since the length of the first microstrip line 7 through which the first reception signal is transmitted and the length of the second microstrip line 8 through which the second reception signal is transmitted are set to be the odd-numbered times of ¼ wavelength of the image frequency relative to the second reception signal and the odd-numbered times of ¼ wavelength of the image frequency relative to the first reception signal, thereby attenuating the image signals, it is possible to improve the image disturbance with ease.

Further, since the first switch means for selecting the first reception signal and the second switch means for selecting the second reception signal are composed of the amplifying elements such as the first FET 3 and the second FET 5, the first reception signal or the second reception signal thus selected may be amplified as it is.

Furthermore, since the first FET 3 and the second FET 5 are comprised of the high electron mobility transistors (HEMTs), the signal selecting circuit may have an excellent NF.

The first reception signal and the second reception signal are inputted through the waveguide (not shown) to the first input terminal 2 and the second input terminal 4. On the other hand, since the frequency of the first local oscillation signal LO1 and the frequency of the second local oscillation signal LO2 are set to be lower than the frequencies of the reception band RF of the first and second reception signals, the frequency of the first image band IM1 and the frequency of the second image band IM2 are much lower than the frequency of the first local oscillation signal LO1 and the frequency of the second local oscillation signal LO2. Having compared the frequency of the first image band IM1 and the frequency of the second image band IM2, it is to be noted that the frequency of the first image band IM1 is lower than the frequency of the second image band IM2. Then, since the waveguide has a highpass filter function, the image signal within the first image band IM1 is attenuated much more than the image signal within the second image band IM2 and inputted to the first input terminal 2 and the second input terminal 4.

Accordingly, when the lengths of the first microstrip line 7 and the second microstrip line 8 are set, it is preferable to set the lengths to be odd-numbered times of ¼ wavelength of the higher frequency (e.g. 9.0 GHz to 9.5 GHz) of the second image band IM2. If so, the image signal within the first image band IM1 is attenuated by the waveguide and the image signal within the second image band IM2 may be effectively attenuated by mainly the first microstrip line 7 and the second microstrip line 8. In addition, if the lengths of the first microstrip line 7 and the second microstrip line 8 are set to be odd-numbered times of ¼ wavelength of the higher frequency (9.0 GHz to 9.5 GHz) of the second image band IM2, then the frequencies of the first local oscillation signal LO1 and the second local oscillation signal L02 become close to each other. Thus, the levels of the first local oscillation signal LO1 and the second local oscillation signal LO2 leaked to the first input terminal 2 and the second input terminal 4 from the first local oscillator 12 and the second local oscillator 13 may be suppressed to be low. Thus, it is possible to reduce the disturbance caused in other satellite broadcasting reception converter or the like.

As described above, in the signal selecting circuit according to the present invention, since the first switch means and the common output terminal are connected by the first microstrip line, the second switch means and the common output terminal are connected by the second microstrip line, the length of the first microstrip line is set to be approximately odd-numbered times of ¼ wavelength if the frequency of the image signal relative to the second reception signal, the length of the second microstrip line is set to be approximately odd-numbered times of ¼ wavelength of the frequency of the image signal relative to the first reception signal and any one of the first reception signal and the second reception signal is outputted to the common output terminal by the first switch means and the second switch means, when the first reception signal is received, the second microstrip line attenuates the image signal relative to the first reception signal, and when the second reception signal is received, the first microstrip line attenuates the image signal relative to the second reception signal, thereby making it possible to improve the image disturbance.

Further, in the signal selecting circuit according to the present invention, since the first switch means is comprised of the first amplifying element and the second switch means is comprised of the second amplifying element, the first switch means and the second switch means may be used not only to select the signals but also as the amplifiers, thereby making it possible to improve a reception sensitivity and an NF.

Further, in the signal selecting circuit according to the present invention, since the first amplifying element and the second amplifying element are comprised of the first high electron mobility type field-effect transistor and the second high electron mobility type field-effect transistor, the signal selecting circuit may become more excellent in NF.

Furthermore, in the signal selecting circuit according to the present invention, since the first reception signal and the second reception signal are arranged within any one of the first frequency band and the second frequency band adjacent to the first frequency band and whose frequency is higher than that of the first frequency band and inputted through the waveguide to the first input terminal and the second input terminal, the length of the first microstrip line is set to be odd-numbered times of ¼ wavelength of the frequency of the image signal relative to the second reception signal in the second frequency band and the length of the second microstrip line is set to be odd-numbered times of ¼ wavelength of the frequency of the image signal relative to the first reception signal in the second frequency band, the first reception signal in the first frequency band and the image signal relative to the second reception signal are attenuated by the waveguide, and the first reception signal in the second frequency band and the image signal relative to the second reception signal may be effectively attenuated by the second microstrip line and the first microstrip line.

Further, in the signal selecting circuit according to the present invention, since the length of the first microstrip line is set to be odd-numbered times of ¼ wavelength of the frequency of the image signal relative to the second reception signal having a frequency higher than approximately an intermediate frequency in the second frequency band and the length of the second microstrip line is set to be odd-numbered times of ¼ wavelength of the frequency of the image signal relative to the first reception signal having a frequency higher than approximately an intermediate frequency in the second frequency band, the levels of the local oscillation signals leaked from the local oscillators to the first and second input terminals may be suppressed to be low. Thus, it is possible to reduce a disturbance caused in other satellite broadcasting reception converters or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A signal selecting circuit comprising:

a first input terminal to which the first mode reception signals are inputted;

a second input terminal to which the second mode reception signals are inputted;

a common output terminal to which one of said first mode reception signals and said second mode reception signals are selectively outputted;

first switch connected between said first input terminal and said common output terminal;

second switch connected between said second input terminal and said common output terminal;

a first microstrip line for connecting said first switch with said common output terminal; and a second microstrip line for connecting said second switch with said common output terminal, wherein a length of said first microstrip line is set to be approximately odd-numbered times of ¼ wavelength of a frequency of an image signals relative to said second mode reception signals, a length of said second microstrip line is set to be approximately odd-numbered times of ¼ wavelength of a frequency of an image signals relative to said first mode reception signals, and said first switch and said second switch allow either said first mode reception signals or said second mode reception signals to be outputted to said common output terminal.

2. A signal selecting circuit according to claim 1, wherein said first switch is comprised of a first amplifying element, said second switch is comprised of a second amplifying element, an input terminal of said first amplifying element is connected to said first input terminal, an output terminal of said first amplifying element is connected to said first microstrip line, an input terminal of said second amplifying element is connected to said second input terminal, and an output terminal of said second amplifying element is connected to said second microstrip line.

3. A signal selecting circuit according to claim 2, wherein said first amplifying element and said second amplifying element are respectively comprised of a first high electron mobility type field-effect transistor and a second high electron mobility type field-effect transistor, the gate of said first high electron mobility type field-effect transistor is connected to said first input terminal, the drain thereof is connected to said first microstrip line, the gate of said second high electron mobility type field-effect transistor is connected to said second input terminal, and the drain thereof is connected to said second microstrip line.

4. A signal selecting circuit according to claim 1, wherein said each mode reception signals are divided into a higher-frequency band and a lower-frequency band, the length of said first microstrip line is set to be approximately odd-numbered times of ¼ wavelength of the image signals relative to said second mode reception signals having a frequency of said higher-frequency band, and the length of said second microstrip line is set to be approximately odd-numbered time of ¼ wavelength of the image signals relative to said first mode reception signals having a frequency of said higher-frequency band.

5. A signal selecting circuit according to claim 4, wherein the length of said first microstrip line is set to be approximately odd-numbered times of ¼ wavelength of the image signals relative to said second mode reception signals having a frequency higher than a middle frequency of said higher-frequency band, and the length of said second microstrip line is set to be approximately odd-numbered times of ¼ wavelength of the image signals relative to said first mode reception signals having a frequency higher than a middle frequency of said higher-frequency band.

* * * * *